US009790044B2

(12) United States Patent
Ortmann et al.

(10) Patent No.: US 9,790,044 B2
(45) Date of Patent: Oct. 17, 2017

(54) PLACEMENT STATION FOR PLACING FLAT ITEMS AND FEEDING THEM TO A SINGULARIZATION STATION AND METHOD

(71) Applicants: Axel Ortmann, Berlin (DE); Wolfgang Muhl, Hohen Neuendorf (DE)

(72) Inventors: Axel Ortmann, Berlin (DE); Wolfgang Muhl, Hohen Neuendorf (DE)

(73) Assignee: Francotyp-Postalia GmbH, Berlin (DE)

( * ) Notice: Subject to any disclaimer, the term of this patent is extended or adjusted under 35 U.S.C. 154(b) by 0 days.

(21) Appl. No.: 15/148,296

(22) Filed: May 6, 2016

(65) Prior Publication Data
US 2016/0325955 A1 Nov. 10, 2016

(30) Foreign Application Priority Data

May 7, 2015 (DE) .................... 20 2015 102 333 U
Apr. 12, 2016 (DE) .................... 20 2016 101 920 U
Apr. 26, 2016 (DE) .................... 20 2016 102 202 U

(51) Int. Cl.
B65H 9/04 (2006.01)
B65H 7/00 (2006.01)
(Continued)

(52) U.S. Cl.
CPC ............. *B65H 9/04* (2013.01); *B65H 1/06* (2013.01); *B65H 3/063* (2013.01); *B65H 3/0638* (2013.01);
(Continued)

(58) Field of Classification Search
CPC .... B65H 9/166; B65H 3/0638; B65H 3/0676; B65H 5/066; B65H 2404/15212; B65H 2801/78; B65H 2701/1916; B65H 27/00
See application file for complete search history.

(56) References Cited

U.S. PATENT DOCUMENTS 4,973,037 A * 11/1990 Holbrook ............... B65H 3/063
271/146
6,005,212 A 12/1999 Van Lierde et al.
(Continued)

FOREIGN PATENT DOCUMENTS

EP 1510480 A1 3/2005
WO WO-2014/066838 A1 5/2014

*Primary Examiner* — Patrick Cicchino
(74) *Attorney, Agent, or Firm* — Schiff Hardin LLP

(57) ABSTRACT

A placement station for placing flat items has multiple transport elements extending through a related opening in a placement deck of the placement station. All transport elements are driven by a single drive motor via toothed belt discs and toothed belts. At least one trigger sensor is arranged in the placement station on the exit side of the mail-item flow. The drive motor and the trigger sensor are electrically connected with means for controlling the transport speed of the flat items. Each transport element is carried by a transport module. The placement station has multiple transport modules, each extending with a transport element mounted on its head side through a related opening in a placement deck of the placement station. The transport modules are lowerable below the placement deck in a direction contrary to a spring force. The direction of traction can be changed by turning at least one transport module before or during operation of the placement station. Each transport element has a barrel-shaped body with an equator, wherein different friction values of said body of the transport element are provided on both sides of the equator. The transport modules are directionally positioned such that the half of the body of the transport element with the higher friction value is closest to the alignment wall.

18 Claims, 9 Drawing Sheets

(51) Int. Cl.
*B65H 27/00* (2006.01)
*B65H 3/54* (2006.01)
*B65H 5/06* (2006.01)
*B65H 3/52* (2006.01)
*B65H 3/06* (2006.01)
*B65H 9/16* (2006.01)
*B65H 1/06* (2006.01)
*B65H 3/56* (2006.01)
*B65H 7/02* (2006.01)
*B65G 39/02* (2006.01)

(52) U.S. Cl.
CPC ......... *B65H 3/0669* (2013.01); *B65H 3/0676* (2013.01); *B65H 3/5238* (2013.01); *B65H 3/54* (2013.01); *B65H 3/565* (2013.01); *B65H 5/062* (2013.01); *B65H 5/066* (2013.01); *B65H 7/00* (2013.01); *B65H 7/02* (2013.01); *B65H 9/166* (2013.01); *B65H 27/00* (2013.01); *B65G 39/025* (2013.01); *B65H 2403/5331* (2013.01); *B65H 2403/92* (2013.01); *B65H 2404/1314* (2013.01); *B65H 2404/1544* (2013.01); *B65H 2404/15212* (2013.01); *B65H 2404/15422* (2013.01); *B65H 2404/623* (2013.01); *B65H 2701/1916* (2013.01); *B65H 2801/78* (2013.01)

(56) References Cited

U.S. PATENT DOCUMENTS

| | | | |
|---|---|---|---|
| 6,942,214 B2* | 9/2005 | Riccardi | B65H 5/021 271/227 |
| 7,255,342 B2* | 8/2007 | Gregoire | B65H 3/063 271/226 |
| 7,478,808 B2 | 1/2009 | Bernard et al. | |
| 8,702,090 B2 | 4/2014 | Geserich et al. | |
| 9,580,263 B2* | 2/2017 | Park | B65H 9/002 |
| 2003/0150079 A1 | 8/2003 | Takai et al. | |
| 2005/0225028 A1 | 10/2005 | Lawless et al. | |
| 2008/0179826 A1* | 7/2008 | Gregoire | B65G 13/10 271/264 |
| 2013/0106048 A1 | 5/2013 | Geserich et al. | |
| 2014/0116841 A1* | 5/2014 | Wilkins | B65G 13/065 198/369.1 |
| 2016/0101958 A1* | 4/2016 | Park | B65H 9/002 271/234 |

* cited by examiner

PLACEMENT STATION FOR PLACING FLAT ITEMS AND FEEDING THEM TO A SINGULARIZATION STATION AND METHOD

BACKGROUND OF THE INVENTION

Field of the Invention

The invention concerns a placement station for placing flat items and feeding them to a singularization station, used in an item processing system, for example as a station of a mail line of a franking system.

Description of the Prior Art

The mail line of a franking system is composed of a number of successively arranged individual mail item processing stations. A placement station is installed in the mail-item flow upstream a singularization station, i.e. in many cases at the beginning of a mail line and serves to place individual or stacked mail items on the singularization station that singularizes the stack. When there is used an upstream enveloping station which successively throws individual enveloped letters on the placement deck of the placement station, said enveloping station will form the beginning of the mail line of course.

A stack of mail items of the same format or of different formats (mixed mail items), that has been put on an alignment wall of the placement station will be singularized in the mail line by means of a singularization station directly following downstream in transport direction because further subsequent mail item processing stations, such as e.g. a dynamic balance, require individually fed mail items. The placement station is intended for use in connection with further stations of the item processing system that follow downstream, for example in connection with franking or addressing machines and other mail item processing units.

In the United States, the "Letter" standard sizes must be processed, such as Letter 8½ inch×11 inch (21.59 cm×27.94 cm), Letter 8½ inch×14 inch (21.59 cm×35.56 cm), Letter 14⅞ inch×11.69 inch (37.8 cm×29.69 cm). In particular in Germany, the sizes B4 (25.0 cm×35.3 cm), B5 (17.6 cm×25.0 cm), B6 (12.5 cm×17.6 cm) and C4 (22.9 cm×32.4 cm), C5 (16.2 cm×22.9 cm), C6 (11.4 cm×16.2 cm) are usual. The sizes of the German paper formats were fixed in the year of 1922 already by Deutsches Institut far Normung (DIN) in the DIN Standard DIN 476.

When speaking of a stack below, this shall mean letter stacks, card stacks and other stacks of mail items that can be singularized, while other stacked flat items shall not be excluded.

Known mail processing devices feed the lowermost mail item of a mail item stack to an alignment wall by means of driven rollers. From U.S. Pat. No. 4,973,037, there is already known a feeding station for a mail handling machine designed for the handling of mixed mail (filled envelopes with open or closed envelope flap) at high speed. The deck is called stack plate. The feeding station is equipped with a device for transversal movement of a side wall relative to the stack plate and with transport devices in a stack magazine area. Part of the transport devices is located below the stack plate. The side wall serves as alignment surface against which the flap edges of envelopes can be positioned. The transport means of the feeding station are eccentrically designed loosening rollers with different friction coefficients that, during a rotation of the loosening roller, alternatingly come up over and go down below a placement deck so that a lowermost flat item of a stack of flat items is intermittently contacted. The friction on the rollers while the flat items are intermittently contacted and the force needed for lifting the stack are very high in case of high and heavy stacks. A plurality of roller groups of loosening rollers is driven by a first motor that must deliver the required force. The plurality of roller groups of loosening rollers is arranged in a rack that can be periodically moved back and forth within a small angular range by means of a second motor and a control disk. The use of such loosening rollers with a force periodically acting on a stack, however, causes an uneven run with an increased noise level. The coupling of undesired oscillation considerably interferes with a dynamic weight measurement in a franking system.

There are already provided means for transporting the mail items in downstream direction as well as also in direction to the alignment wall as well as for loosening up the mail items (open or closed filled envelopes) of a stack so that they can slide more easily over one another. There was also proposed multiple inclining of the mail item stack plate in the stack magazine area in order to use gravity for aligning the mail items. By a multiple inclining of the mail item stack plate in the stack magazine area, the envelope may get jammed when passing into the feeding sector in a horizontal position, in particular with an open envelope flap. Due to the small angular sector, an alignment of the mail items is only possible to a limited extent.

According to EP 1 533 260 B1, a jogging device is proposed for feeding mail items (letters) to a singularization station. On the entire width of the sluice of the above-mentioned singularization station, there is provided an outer strip with a movable sliding rail at the end of which a jogging flap is arranged. After placing a stack with letters lying on their side, the letters are moved by means of the jogging flap in longitudinal direction against a reference wall and thereby are loosened up by means of the jogging flap and thus are aligned, i.e. put in the correct position before a subsequent singularization and printing. The jogging flap forms a laterally shiftable stop with a sliding guide that must be adjusted to the letter width and can be locked in this position by means of a friction brake. The jogging flap acts directly on the lateral positioning of mail items. In addition, there is also provided a second sliding guide that allows a resilient overstroke by means of a spring so as to avoid jamming of the letters. However, only letters having the same format can be aligned with this device.

A feeding device according to EP 1 958 902 B1 is provided with an improved transport device having a plurality of drive members with the special feature that they consist of a cylindrical wheel with teeth provided on its circumference in a gear-wheel-like manner between which axles for small non-driven independently rotatable rollers are arranged. An alignment is possible by manually moving a mail item or a stack of mail items on an alignment wall.

EP 1 510 480 B1 refers to an alignment device of a mail handling system having jogging and alignment devices with a plurality of retractable elements that extend through openings in a horizontal plate the distance of which to an alignment wall (reference wall) can be adjusted according to the format of the mail items in order to guide the mail items in a forced manner, which shall contribute to prevent an inclining of the mail items.

In the above-mentioned European patents EP 1 533 260 B1, EP 1 958 902 B1, and EP 1 510 480 B1, the functions of placement station and singularization station were combined in a single feeding and printing station. There were also used driven transport rollers, but they cannot be adjusted in their angular position in relation to the transport direction. The correct alignment of the mail items is realized by means of sliding elements and jogging elements of various kinds.

These item processing appliances are very noisy during operation and also susceptible to failure in the processing of a stack of mail items. While the alignment of individual mail items is unproblematic, there may already occur problems in the alignment of a stack of mail items of the same format when there are differences in sizes. Major problems occur in the alignment of a stack of mixed mail containing mail items of different thicknesses and different dimensions.

In the field of franking machines, it is already known to transport a singularized mail item from a stack in transport direction downstream the mail-item flow and printing a franking print on it during the transport. In the Centormail® franking machine of the applicant, there is already transported mixed mail standing on the edge using a transport belt, wherein the mail items are automatically aligned on the edge by the effect of gravity.

In the field of franking machines, there are also known solutions that transport a mail item lying on a side in transport direction downstream the mail-item flow, like for example the PostBase® franking machine of the applicant. To this franking machine, an automatic feeding station can be added on the mail-item entrance side. The franking system formed this way, however, is not suitable for mixed mail, but only for mail items of the same format.

In the German utility model DE 20 2011 107 379 U1 that is equivalent to U.S. Pat. No. 8,702,090 B2, there was already proposed a modular placement device for a feeding station. The feeding station follows, in the direction downstream the mail-item flow, the placement station that is designed as a module for merely manual operation without own drive technology the placement deck of which can be put up in a ramp-like manner when required. Due to the ramp put up, the effect of gravity is used in the feeding of mail items. But the mail items are not aligned by the effect of gravity. There is rather provided a slider by means of which a stack is manually pressed on a guide plate of the placement station that serves as alignment wall. This way only differently thick mail items of the same format can be reliably processed up to a rate of 65 mail items of the DIN format C6 or C6-long per minute. Thus, it can be ensured by means of the slider that all mail items of a mixed-mail stack lie on the alignment wall with their side edge. Edge alignment becomes problematic when the mail items transported in a position lying on their side shall be aligned on an alignment, placement or guide wall without the contribution of gravity. To be on the safe side, a stack of mail items is therefore manually aligned on one edge of the stack and then is placed. In practice, there do also occur deviations in the format of mail items, which may lead to undesired failures in operation.

In the following, the term mixed mail shall mean differently thick, flat mail items of a stack mainly of the same format that, despite a tolerance of up to +/−20 mm, must be processed by the mail item processing stations.

It is a problem to develop a placement station for placing an individual flat item as well as also a stack of flat items and feeding them to a singularization station that allows for a higher throughput of flat items, wherein the flat items are transported lying on their side and the above-mentioned disadvantages of the prior art do not occur. The placement station shall be designed as a separate module for edge alignment of flat items with own drive equipment to be arranged in a position upstream a singularization station. The correct alignment of a stack of flat items (mail items) shall be realized without sliding elements and jogging elements of various kinds as they are usual for flat items of the same format. It is known that, with a higher throughput, the error rate in the singularization of a flat item from a stack increases, too. When drawing the respective lowermost flat item off from an aligned stack, the other flat items remaining in the stack may be inadvertently put into an unaligned position so that the alignment edge of some of the flat items may reach a distance of 3 to 5 mm from the alignment wall. Then, the stack is not correctly aligned anymore. It is intended that the stack may contain flat items of different thickness and with format deviations in length and width while, nevertheless, the placement edge of the respective lowermost one of the flat items of the stack shall be correctly guided to the alignment wall and aligned. In particular, the placement station together with the singularization station shall allow for a higher throughput of up to 100 mail items of the DIN format C6 or C6-long per minute.

In such a placement station, the error rate may further increase due to such flat items the surfaces of which have a very different friction coefficient in case of contact with the surfaces of other items or with the surfaces of the transport elements, in particular also in case of items that are not mail items. By the internal drive technology of the module, there may be exerted on the flat items, selectable via traction, other forces than by the effect of gravity so that squeezing or crumpling of a flat item, such as e.g. a letter envelope, on the alignment wall becomes more probable when the drive equipment shall not only feed the flat items in transport direction to the feeding station immediately following downstream, but also align them on the alignment wall. Therefore, it is a further problem to reduce the error rate and increase the singularization reliability by a correct alignment of the stack. The flat items lying directly on the placement deck, i.e. the lowermost, non-aligned flat items of a stack shall be automatically aligned on the alignment wall of the placement station without the occurrence of any squeezing or crumpling of a flat item on the alignment wall.

It is intended that the flat items within a stack may have different dimensions (thickness and dimension deviations). The placement station should be suitable for mail items, but also for other stackable items which have format deviations of up to 20% in length and width.

SUMMARY OF THE INVENTION

The problem is solved by a placement station according to the invention that has a plurality of transport modules each of which projects with a transport element mounted on its head through a related opening in a placement deck of the placement station in a z-direction of a Cartesian coordinate system, the z-direction being opposite to the direction of gravity. Each transport element has a ball-shaped, round or barrel-shaped body with an equator, wherein different friction values of said body of the transport element are provided on both sides of the equator and the transport modules are positioned in such a direction that the half of the body of the transport element with the higher friction value is closest to the alignment wall. This way, the flat items can be shifted from the half of the body with the lower friction value over the equator in y-direction to the alignment wall when the component of the tractive force exerted by the transport elements of the variably positionable transport modules in y-direction is sufficient. It is provided that the transport modules are arranged in a manner lowerable below the placement deck in the direction of gravity contrary to a spring force F1.

The transport elements of all transport modules are driven by a single drive motor via toothed belt roller, toothed belt and toothed belt discs. At a minimum distance to the alignment wall, a row a of transport modules that can be positioned in a fixed alignment direction and, at larger up to maximum distance from the alignment wall, further rows b, c, d of transport modules that can be positioned in variable directions are arranged, each row extending in a transport direction x of the Cartesian coordinate system and row c neighboring row d, row b neighboring row c, and row a neighboring row b in the y-direction of the Cartesian coordinate system. On the one hand, the rows b, c, d that can be positioned in variable directions are provided for aligning, on the alignment wall, flat items which are individually and successively ejected from an upstream enveloping station onto the placement deck of the placement station. On the other hand, rows b, c, d are also provided for aligning a stack of large-format flat items that is put on the placement station.

Each of the transport elements of the transport modules exerts a tractive force component in transport direction x and in y-direction, the tractive force component in transport direction x being predominant. Each of the transport elements of the aforementioned row a of transport modules that can be positioned in a fixed alignment direction exerts a tractive force component in y-direction that is zero or at least very small in comparison to the transport elements of the aforementioned rows b, c, and d that can be positioned in variable directions.

The transport modules are arranged in y-direction below the placement deck in a block of four and a block of six, the block of four being close to the front side of the placement station and the block of six being closer to the alignment wall.

It was empirically found that a common drive for a number of driven transport elements is sufficient, said transport modules being arranged below the placement deck and extending with a part of the transport element through a respective assigned opening in the placement deck in z-direction, said part exerting a tractive force on a flat item. A pressure fork subjected to a spring force that presses the stack against the transport elements is arranged in such a way that the stack is simultaneously pressed against the alignment wall. It is an advantage off the pressure fork that it prevents the uppermost mail items from slipping of the stack. Regarding the adhesive friction between the lowermost item of the stack and the respective subsequent flat item to be singularized, the weight of the stack must be taken into account when the lowermost flat item in the stack shall be the first to be singularized and the flat items are not transported by the transport elements in a position standing on their edge, but lying on their side. In an advantageous manner, there can be avoided additional means for jogging the stack as they have been necessary for loosening up the flat items so far according to the prior art. This is achieved by the direction adjustment of the transport elements and their arrangement at a minimum distance to the alignment wall of the placement station, the special design of the part of the body of the transport elements extending through openings in the placement deck that, in its first half causes a higher adhesive friction than occurs between the flat items (mail items) and that, in its second half, has a lower friction coefficient (friction value) than in the first half. The lower friction coefficient of the part of the body advantageously allows a sliding friction for the flat item that is shifted in y-direction, i.e. at right angles to the transport direction when the item or the stack is placed. So it is in particular of advantage for a dynamic dimension and/or weight measurement in a station following in downstream direction when, due to the transport modules permanently positioned at minimum distance to the alignment wall of the placement station, a sliding friction in y-direction and an adhesive friction in transport direction x has an effect on the flat items. Measuring errors of a dynamic balance will hardly occur when there is no jogging movement in any station. The respective lowermost mail item of a stack with several stacked mail items can be shifted to the stop on the alignment wall without an occurrence of sudden shocks and only then will be drawn off the stack.

It was also empirically found that, when drawing off the respective lowermost flat item, a stack must be stably retained in a draw-off position that prevents a canting of subsequent further flat items (mail items) during the drawing-off of the respective lowermost flat item (mail item) of a stack. This is also achieved without using jogging elements and by the variable alignment and special arrangement of the transport modules and the design of the transport elements.

There are provided setting means for direction adjustment in order to turn the transport modules by means of mechanical shifting into an angular orientation relative to the transport direction so as to adapt the placement station to the enveloping station this way. The setting means for direction adjustment allow a manual setting of the force component exerted in y-direction.

The design of the setting means for direction adjustment allows for example an adjustment of the angle of orientation from 0° to 45° relative to the transport direction x by fixed steps, angular segments being set in the range from 3 to 9°. This way, the traction in the transport direction x and the traction in y-direction towards the alignment wall can be varied. Advantageously, an adjustment of the angle of orientation of the transport modules having one transport element each is also possible during the processing of the flat items.

By means of a tooth system, all variably positionable transport modules are connected in their various angular positions in a self-locking manner with each other and with a setting mechanism, which prevents an unintentional independent changing of the angle of orientation during the transport of a flat item. The setting mechanism is part of a direction alignment mechanism having a transmission that increases or reduces the setting force.

The individual transport modules can be differently oriented during their installation in the placement station and then can be jointly shifted in their direction by a pre-defined angle. Accordingly, it is also possible to achieve that the variably positionable transport modules more distant from the alignment wall have a steeper alignment angle towards the alignment wall than the transport modules variably positionable in their orientation that are less distant from the alignment wall. This way, the edges of small-format flat items can get more quickly to the alignment wall when they impinge or are placed on the placement deck. Furthermore, apart from the above-mentioned means for setting the orientation state of the transport elements of the placement station, there are also provided means for controlling the transport speed of the flat items transported by the transport elements in the transport direction x.

Sensors can be arranged on the placement deck and or on the alignment wall of the placement station. At least one trigger sensor is provided in the placement station on the exit side of the mail-item flow. The trigger sensor can be designed for example as a transmitted-light barrier comprising a light-emitting diode (LED) as transmitter unit and a phototransistor as receiver unit. The transmitter unit is arranged below an opening in the placement deck. The receiver unit is arranged behind an oblong opening in the alignment wall of the placement station and 20-30 mm above the opening in the placement deck, wherein a light beam emitted crosswise to the y/z plane of the Cartesian coordinate system is received when no flat item is properly in place.

The transport modules are lowerably arranged under the placement deck of the placement station. Advantageously, this allows, on the one hand, a limitation of the friction value in the processing of heavy items and, on the other hand, and adjustment to the thickness profile in x- and y-direction of each mail item. Advantageously, there is also achieved a more even loading of the common motor of the placement station.

In a first embodiment, only a singularization station has a control unit. A computer program allows a data processing by the control unit of the singularization station after loading it into the memory means of the common control unit for carrying out a process for controlling the transport elements of the placement station and a process for the singularization of mixed mail by the singularization station in a pre-defined time sequence. The trigger sensor delivers a signal as soon as a flat item or a stack with flat items is present in the sensor area, wherein it is provided that the control unit analyses these signals in order to drive the common motor of the placement station and a further motor in the singularization station when the flat item or a stack of flat items has been correctly placed.

The placement station and the singularization station are accommodated in respective separate housings and have an interface each. The placement station moreover has sensors for monitoring the movement of the stack or of the flat items and an encoder the signals of which are analyzed by the control unit for determining the transport path covered. The sensor and encoder signals of the placement station are interrogated for via the interfaces by the control unit of the singularization station. Via the interface, encoder and sensor signals from the placement station can be delivered to the control unit of the singularization station and control signals from the control unit of the feeding station can be transmitted to the drive motor for controlling the transport speed. All transport modules of the placement station are jointly driven. The drive motor is an electric motor having a drive shaft that, via further means such as toothed belt roller, toothed belt, is coupled for driving purposes with a rotatable toothed belt disc mounted on a fixed axis with a firmly connected encoder disc. The electric motor is electrically connected with the interface of the placement station. The placement station and the feeding station have separate power supply units or use a common power supply unit that is arranged in one of the aforementioned two stations.

In a second embodiment, there is provided a control unit in the placement station and in the singularization station each. The control unit of the singularization station is in a communication connection with the control unit of the placement station. A first computer program allows data processing by the control unit of the placement station after loading it into the memory means of the control unit for carrying out a process for controlling the transport elements of the placement station in a pre-defined time sequence. A second computer program allows data processing by the control unit of the singularization station after loading it into the memory means of its control unit for carrying out a process for the singularization of mixed mail by the singularization station in a pre-defined time sequence. The control unit of the placement station and the control unit of the singularization station are accommodated in respective separate housings and are in a communication connection with one another. The placement station and the singularization station again have respective sensors, encoders and separate power supply units.

In connection with a third embodiment, there is provided a computer program that allows data processing by a common control unit of an item processing device after loading it into the memory means of the common control unit for carrying out at least a process for controlling the transport elements of the placement station and a process for the singularization of flat items of different formats by the singularization station in a pre-defined time sequence. The individual stations are accommodated in a common housing and are in a communication connection with each other. The item processing device has a common power supply unit.

There are provided sensors for detecting the placement of a stack or individual flat item, an encoder and maybe a further sensor for detecting an incorrect position alignment of the stack or individual flat item. The sensor signals and the encoder signals of the encoder of the placement station can be interrogated by the control unit. In the preferred embodiment, the trigger sensor is also used for the detection of an incorrect position alignment of the stack or individual flat item.

In a further embodiment, not shown, it is provided to control a further electrically controllable shifting motor, preferably an electric motor, for angle adjustment with a very slight delay and to realize the angle adjustment by means of software as required, wherein further sensors are provided for sending sensor signals to the control unit for determining the requirements. For detecting the current angle adjustment, sensors are arranged below the placement deck within the range of a distance G between the rows c and d of the transport modules as well as between the block of four and the block of six of the transport modules. A connecting part for toothed racks is designed to interrupt, depending on the direction or adjustment of the toothed racks, a light beam of at least one sensor or sensor array. The sensor or the sensor array is/are for example mounted on the surface of the same bearing plate on which the transport modules are arranged as well. On the other hand, for detecting a present inclined position of the positioning edge of the respective lowermost flat item in the stack, further sensors are arranged below the placement deck in an area close to the alignment wall, between the row a of transport modules and the alignment wall. There may be used tactile or optical sensors that extend through respective openings in the placement deck.

The invention also encompasses a computer-readable memory medium on which program code is stored that, after having been loaded into a memory of the control processor of the separate or common control computer, cause implementation of at least one process for controlling the transport elements of the placement device or of the placement station and a process for the singularization of flat items of different formats by the singularization station in a pre-defined time sequence. The technical process includes the following process steps:

a) Equipment of a placement deck of a placement station with transport modules for edge alignment and for the transport of individual flat items or flat items in a stack in the transport direction x for feeding the flat items into a downstream singularization station, said flat items being of equal or different formats.

b) Driving of a common drive motor of the transport elements in order to allow an automatic placement of the stack on the alignment wall in y-direction as well as a transport of the stack in the transport direction x for feeding the flat items to the singularization station, wherein a first partial number of the transport elements is effective at a minimum distance from the alignment wall and a second partial number of the transport elements is effective at a greater up to maximum distance from the alignment wall, wherein the distance is selected according to the maximum format in such a way that the transport elements are effective from the edge up to the middle of a flat item of the maximum format.

c) Provision of a setting means and of a direction alignment mechanism as well as execution of a joint adjustment of the second partial number of driven transport elements to an alignment direction between the x- and y-directions in order to allow an adjustment and transport of the stack or of a flat item in transport direction.

The drive motor has a motor shaft that is connected by positive joint with a toothed belt drive roller which drives a further toothed belt disc via a toothed belt. These drive means form a common drive for a number of driven transport modules. The further toothed belt disc together with a small gear wheel is designed as a first transmission stage and rotatably mounted on a further fixed axle. A second transmission stage is respectively provided for the block of four and the block of six transport modules. Each of the two second transmission stages has a large gear wheel and a toothed belt disc connected with each other by positive joint. The first transmission stage and the two second transmission stages form a transmission for a number of toothed belt discs. The transmission is provided as a further means of the common dive pertaining to the drive means.

Each of the toothed belt discs of a number of toothed belt discs, said toothed belt discs being assigned to the transport modules, is designed as a radial slide bearing with a bearing bushing for an inserted sliding member and with a centric opening the profile of which corresponds to the pre-defined profile of the drive shaft of the transport module.

It is provided that the motor of the common drive is arranged in a space between the alignment wall and the rear side of the placement station.

It is further provided that position alignment means are mechanically coupled with an actuating means via a movement mechanism for a direction alignment of some of the transport elements, said movement mechanism being arranged in a space between the alignment wall and the front side of the placement station and below the placement deck.

BRIEF DESCRIPTION OF THE DRAWINGS

FIG. 3*a* shows detail B1 of FIG. 3.

DESCRIPTION OF THE PREFERRED EMBODIMENTS

Figure 1:
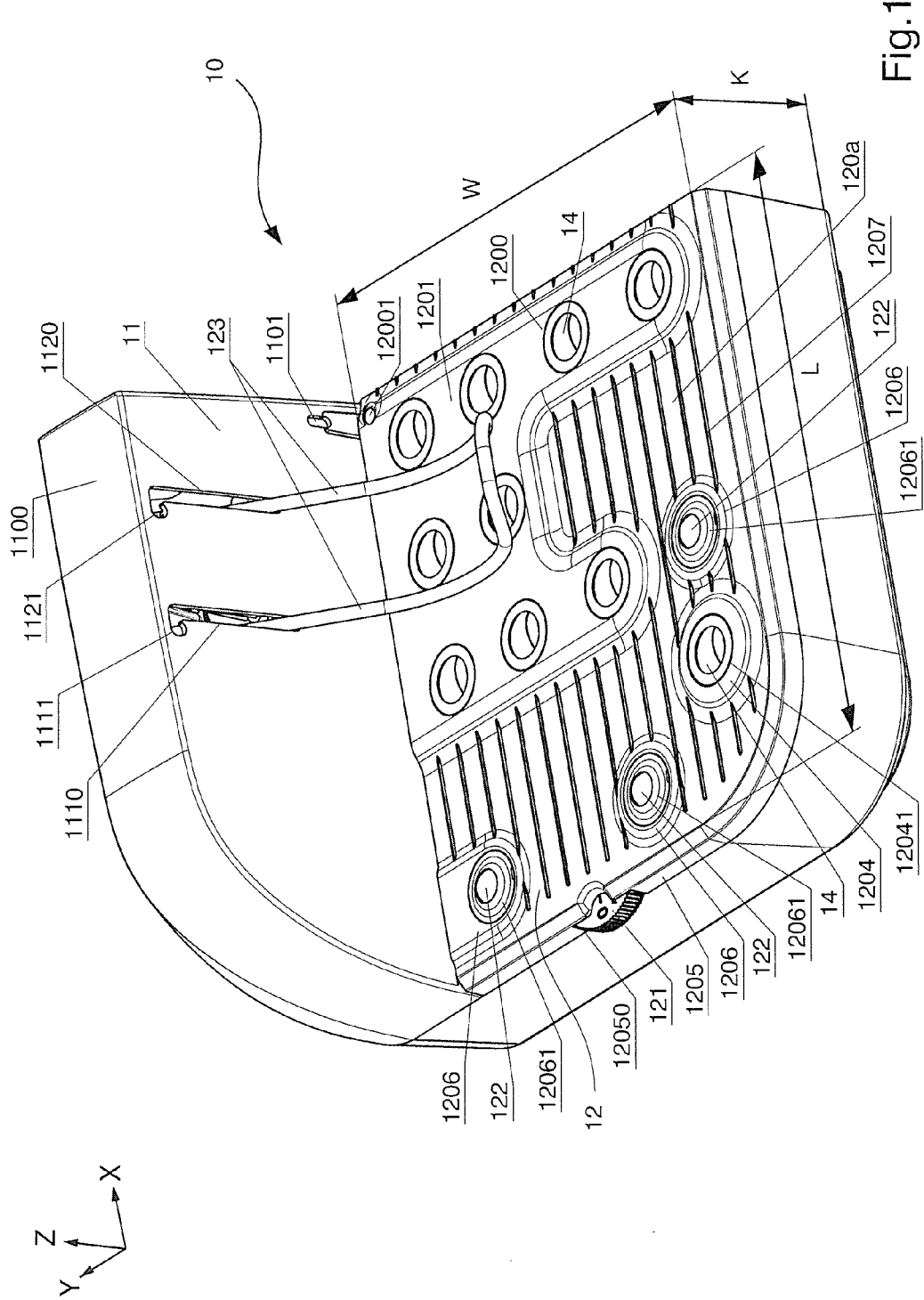
FIG. 1 is a perspective view of a placement station with a number of transport elements, from the front upper left.

FIG. 1 shows a perspective view of a placement station with a number of transport elements, from the front upper left. The placement station 10 has a vertical alignment wall 11 on an x/z-plane and a placement deck 12 on an x/y-plane of a Cartesian coordinate system. The length L and the width W of the placement deck 12 maximally correspond to the format of the biggest flat item (mail item) that can be placed on the placement station 10. The x/y-plane of the placement deck 12 is at a distance K above a table top (not shown) and the vertical alignment wall 11 extends above the placement deck 12 by a height of approx. 2K up to a top surface 1100 of the housing on the upper edge of the alignment wall 11. The latter has a first oblong guide hole 1110 and a second oblong guide hole 1120 in the alignment wall. On the upper edge of the first oblong guide hole 1110, there is provided a branch opening 1111 and, in the same manner, on the upper edge of the second oblong guide hole 1120, a branch opening 1121 is provided that branches off contrary to the x-direction, into which a pressure fork 123 can be put down for placing a stack of flat items by hand. The maximum span of a human hand is <2K just like the stack height, which is why a stack can be easily placed on the alignment wall 11 under the lowered pressure fork 123. The top side 120*a* of the placement deck 12 is structured and has three islands 1206 for non-driven free-moving balls 122 respectively kept in position by a bearing shell 12061, two positions being located on the entrance side of the mail-item flow and one position being located close to the front side of the placement station. An individual island 1204 is located on the entrance side of the mail-item flow near the front left corner on the top side 120*a* of the placement deck 12. It has a circular central opening 12041 in the middle of the island for a driven transport element 14 still lying in an area on the mail-item entrance side of the placement station. On the top side of the placement deck, ribs 1207 are arranged in transport direction. In transport direction, the top side 120*a* of the placement deck 12 passes into a plateau. The mail-item entrance side area ends on the passage. A smooth surface 1201 of the plateau on the top side of the placement deck has a number of circular openings 1200 in a pre-defined arrangement. Each of the transport modules 1 (FIG. 2) carries a transport element 14. The transport elements 14 for flat items extend through the circular central opening 12041 in the middle of the island and through the openings 1200. On the edge of the placement deck on the entrance side of the mail-item flow, there is arranged a collar 1205 with an opening 12050 for a setting means 121 for the direction adjustment of the transport modules 1. A trigger sensor is arranged on the exit side of the mail-item flow close to the edge between the alignment wall 11 and the placement deck 12. In the alignment wall 11, there is provided an oblong hole 1101 for a receiver means and, in the placement deck 12, there is provided a circular opening 12001 for a transmitter means of the trigger sensor. Optionally, further sensors (not shown) can be arranged in circular openings 12002 to 12004 in the placement deck 12, said sensors being provided for detecting the position of the flat item or the placement state of the lowermost flat item of a stack, respectively.

Figure 2:
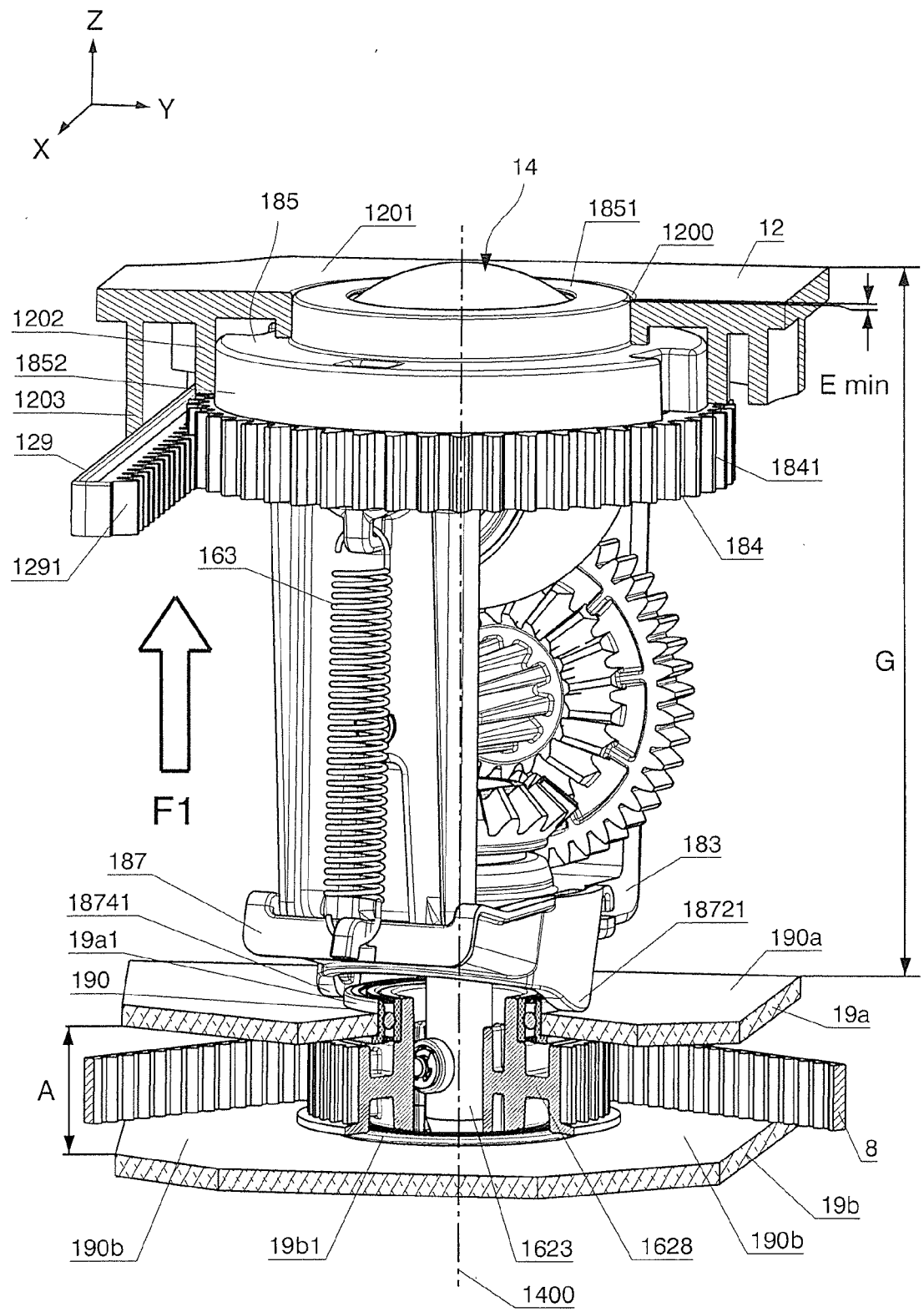
FIG. 2 is a perspective view of a section of a placement station with an installed transport module, from the upper right.

FIG. 2 shows a perspective view of a section of a placement station with an installed transport module, from the upper right, the transport module 1 carrying a transport element 14 for flat items which is mounted on the head of the transport module and extends through the circular opening 1200 of the placement deck 12. The distance E of the surface 1201 of the placement deck 12 to a surface 1851 of a retaining ring 185 is minimal and the installed transport module is in a first state without limitation of the friction value. A transport element carrier 18 of the transport module 1 is arranged between the placement deck 12 of the placement station and a bearing plate 19*a* arranged in a between-deck manner, wherein the lever ends effective for limiting the friction value 18721, 18741 of a lever 187 bear against the surface 190*a* of the bearing plate 19*a* so that, due to the force F1 of the tension spring 163, the transport module is maximally lifted in z-direction. A distance G of the surface 1201 of the placement deck 12 to the upper side of the bearing plate 19*a*, without the projection of the transport element 14 over the surface of the retaining ring 1851, corresponds to the length of the installed transport module in z-direction in the first state without limitation of the friction value, wherein G<K applies. The retaining ring 185 prevents the falling-out of the transport element 14 from the inner space of the carrier ring 184.

An annular collar on the outer diameter 1852 of the lower circular disc of the retaining ring (185) is shaped as a head-side bearing which is borne within a circular bearing ring 1202 formed on the lower side of the placement deck 12. A first foot-side bearing 19*a*1 is arranged in a bearing hole 190 of the bearing plate 19*a*, wherein a cylindrical step of a toothed belt disc 1628 is rotatably borne in the first bearing 19*a*1 and a drive shaft 1623 of the transport module is shiftably borne in a central opening of the toothed belt disc 1628. The bearing 19*a*1 shall have a low friction; preferably a ball bearing is used. The toothed belt disc 1628 has an outer edge of the toothed belt disc 16281 with a diameter larger than the diameter of the toothed belt disc. All toothed belt discs are of an equal design. In the first bearing 19*a*, there is inserted the cylindrical step of the toothed belt disc 1628 and also the cylindrical shaped part on the opposite side is inserted in a second bearing 19*b*1 that is arranged in a second bearing hole of a counter-bearing plate 19*b* so that the toothed belt disc 1628 is rotatably borne. Also the second bearing 19*b*1 shall have a friction as low as possible; preferably a ball bearing is used here, too. In the figure, the upper side 190*b* of the counter-bearing plate 19*b* conceals the cylindrical shaped part and the second bearing 19*b*1, but these two bearings are of equal dimensions.

A movement mechanism (not shown) for changing the alignment direction of some of the transport elements 14 comprises a toothed rack 129. The toothed rack 129 has a toothing 1291 at least on one side, the teeth of which are in engagement with the teeth of an annular external gear rim 1841 of a carrier ring 184. The carrier ring 184 rotates with a movement of the toothed rack 129 that moves within a guide space that is limited in a direction opposite to the y-direction by a guide wall 1203 formed on the underside of the placement deck 12.

As an alternative to the actuating means, a shifting motor can be mechanically coupled with the toothed rack 129 of a direction alignment mechanism via a movement mechanism, said shifting motor being driven by a control unit.

The transport module is borne rotatably around an axis of the drive shaft 1623 and arranged to be shiftable in axial direction, said drive shaft 1623 being arranged standing orthogonally on the bearing plate 19*a* and oriented in axial direction parallel to the z-direction. The rotation axis 1400 of the transport module is simultaneously the axis of the drive shaft 1623.

Below the placement deck 12, there is provided a space for a common drive mechanism. A space is limited in z-direction by the first distance A between the bearing plate 19*a* and the counter-bearing plate 19*b* and is provided for a common drive for a plurality of transport modules. The common drive comprises a drive unit and for example a toothed belt 8 and the toothed belt disc 1628. The central opening of the toothed belt disc 1628 has a shape contour in axial direction in which the drive shaft 1623 of the transport module is borne by positive joint, but easily shiftable in axial direction (z-direction).

In a second state of the installed transport module, the friction value is limited. Now the lever 187 is maximally lying (in a manner not shown) on the top side 190*a* of the bearing plate 19*a*. The distance E between the surface 1201 of the placement deck 12 and the surface 1851 of an upper circular disc of the retaining ring 185 becomes maximal because, in the case where a pressure force exerted by the stack is bigger than the spring force F1, the transport module is not lifted in z-direction anymore by effect of the force F1 of the spring means 163. The transport element 14 goes down in the direction of gravity so that the transport element 14 does not project over the surface of the placement deck 1201 anymore. The minimum length of the installed transport module in z-direction in the second state corresponds to a difference of the distance G of the surface of the placement deck 1201 to the upper side 190*a* of the bearing plate 19*a* minus the stroke with the maximum distance E between the surface of 1201 of the placement deck 12 and the surface 1851 of the upper circular disc of the retaining ring 185. In the direction of gravity, the carrier ring 184 passes into lateral legs of the transport element carrier which meet in a yoke 183 having a central opening (not shown). The drive shaft 1623 of the transport module projects out of the opening (not visible) of the yoke 183 from the transport module in a length corresponding to the sum of the distance A and the stroke with the maximum distance E.

Figure 3:
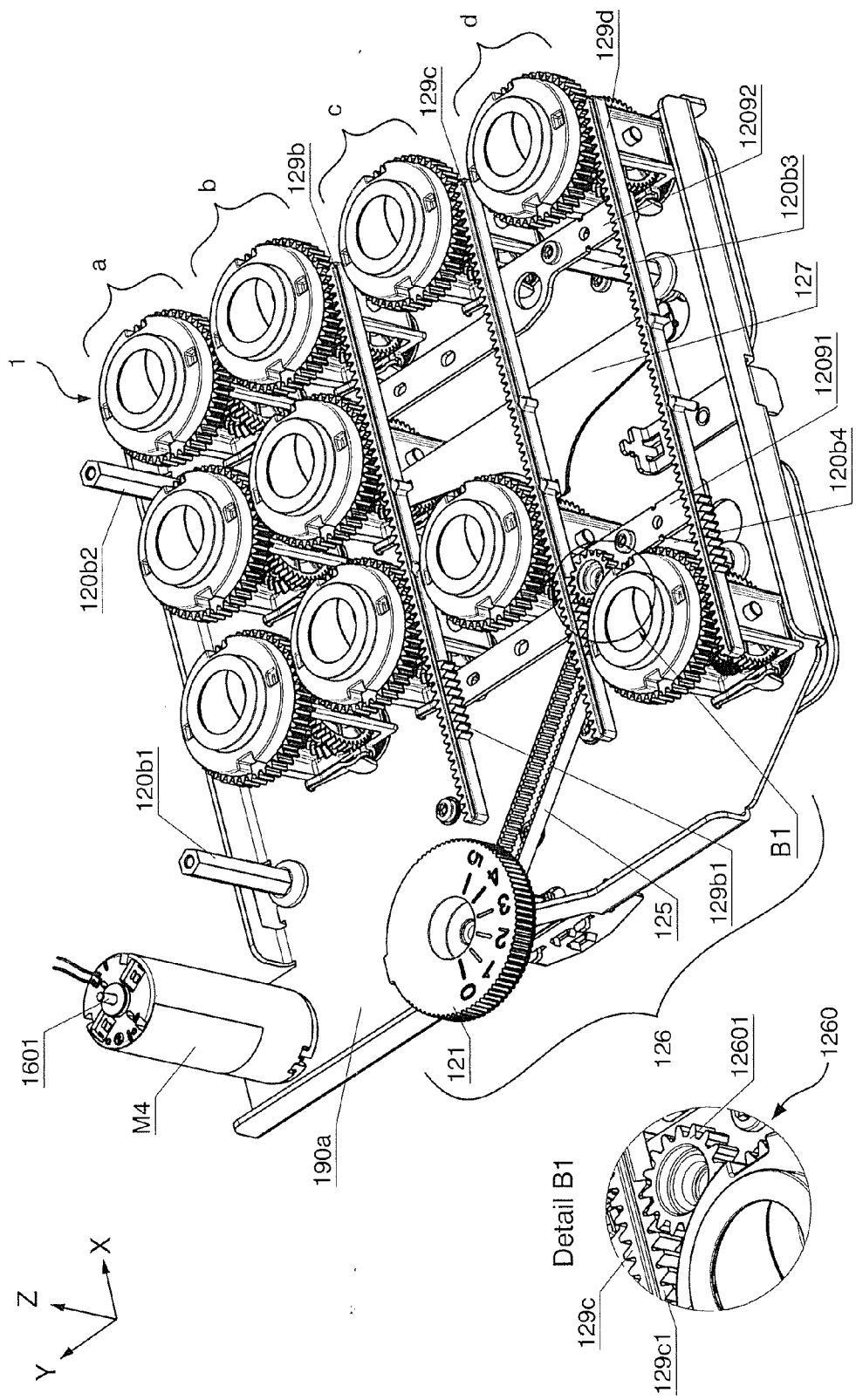
FIG. 3 is al perspective view of a number of transport modules mounted on a top side of a bearing plate, from the front upper left.

FIG. 3 shows a perspective view of a number of transport modules mounted on a top side of a bearing plate, from the front upper left. On the periphery of top side 190*a* of the bearing plate, there are arranged a motor M4, a setting means 121 and four spacers 120*b*1 to 120*b*4 extending in z-direction. The motor M4 has a motor shaft 1601 for driving the transport elements, the drive means (not visible) being arranged below the bearing plate 19*a* (see FIG. 5). The transport modules 1 are arranged in rows a, b, c, and d. The transport modules 1 of the rows a and b are arranged in a block of six. Rows a and b comprise three transport modules 1 each. The transport modules 1 of the rows c and d are arranged in a block of four. Rows c and d comprise two transport modules 1 each, one at the beginning and one at the end of the row, respectively. Between rows b and c, a toothed rack 129*b*, between rows c and d, a toothed rack 129*c*, and close to the front side, a toothed rack 129*d* of a direction alignment mechanism are arranged. The toothed racks 129 have an uninterrupted row of teeth on the one side pointing to the alignment wall that extend in x-direction and engage with the teeth of the annular external gear rim 1841 of the transport modules of row b. An opposite shape contour 129b1 on the other side of the toothed rack does also have teeth that, however, are not arranged continuously on the entire length of the toothed rack, but only on a partial section of the toothed rack. All of the three toothed racks 129 are of the same design and coupled with each other by a connecting part 127, the latter being arranged between the two holding sheets 12091 and 12092 for the toothed racks 129. The holding sheets are of equal design and serve as carrier and bearing sheet for the toothed racks 129. The holding sheets are screwed on the spacers 120b3 and 120b4. The holding sheets have, apart from the fixing hole, also a mounting hole. In the mounting hole 12091, there is mounted a toothed belt disc the diameter of which corresponds to the outer diameter of a stepped cylinder on a toothed belt disc. The holding sheets have further fixing holes for fixing them to the underside of the placement deck (see FIG. 4). The opposite shape contour 129b1 is arranged at the one end of the toothed rack that is closer to the setting means 121 than the other end. The setting means 121 is coupled with a toothed belt 125 and forms a transmission 126. The toothed belt 125 interacts with an intermediate transmission 1260 of the transmission 126 of the direction alignment mechanism. The intermediate transmission is mounted in the mounting hole of the holding sheet 12091 and is shown enlarged in the detail B1 in FIG. 3a.

FIG. 3a shows a detail B1 of FIG. 3 with an intermediate transmission 1260 of the direction alignment mechanism. The intermediate transmission 1260 of the direction alignment mechanism 126 has a pinion 12601 that, on the one hand, engages with the teeth of the shape contour of the toothed rack 129b and, on the other hand, is connected by positive joint with a toothed belt disc 12602 (see FIG. 4). The toothed belt 125 (see FIG. 3) acts on the annularly arranged teeth of the toothed belt disc 12602 for shifting the toothed rack 129b.

Figure 4:
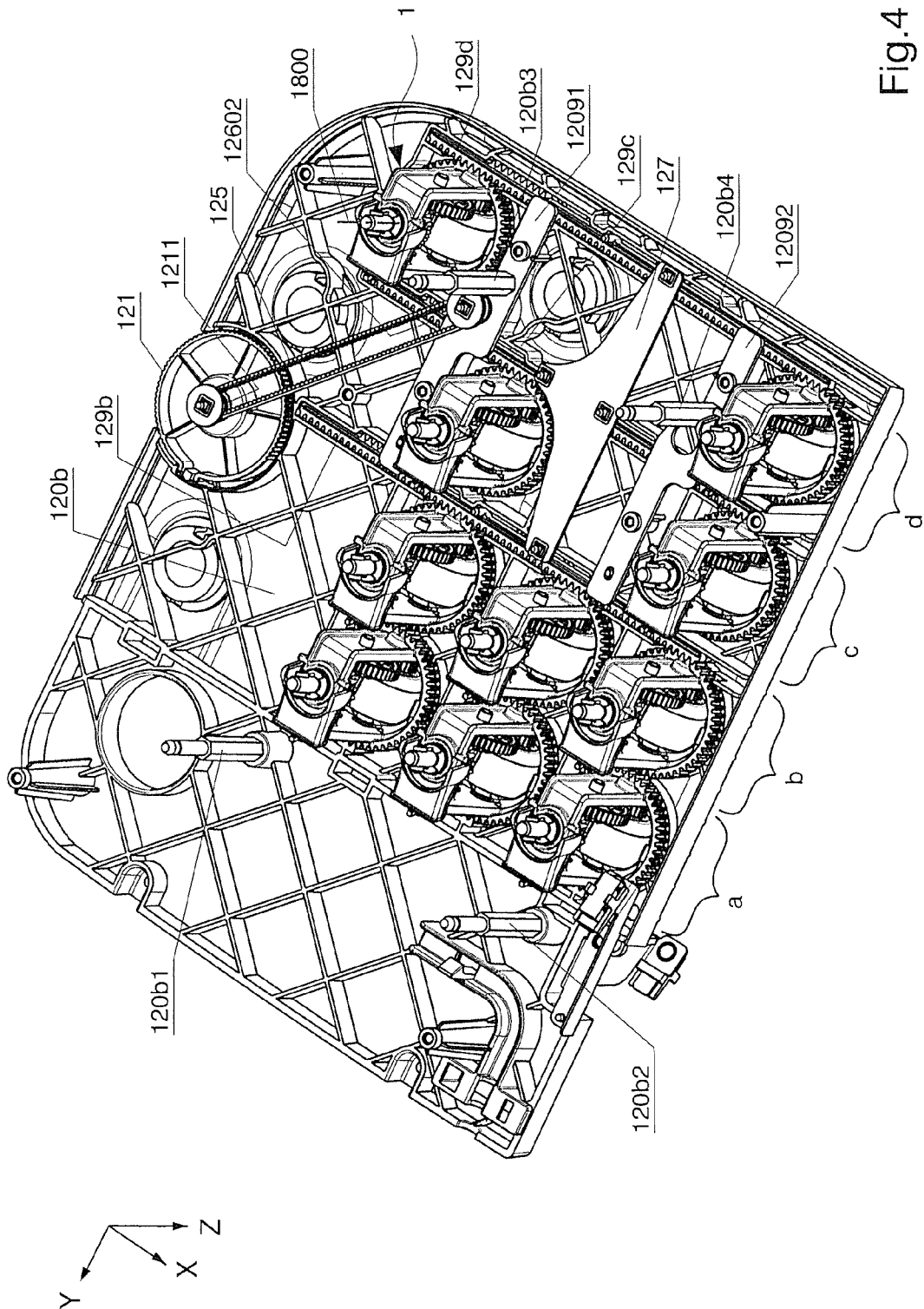
FIG. 4 is a perspective view of an underside of the placement deck with installed transport modules.

FIG. 4 shows a perspective view of an underside of the placement deck with installed transport modules. The length of the drive shaft 1632 projects from a central opening of the yoke of the transport module 1. The rotation axis 1800 of the transport module 1 runs through the center point of the cross section of the drive shaft 1623. The holding sheets 12091 and 12092 are fixed by two screws each to the underside 120b of the placement deck. Thus, the toothed racks 129b, 129c, 129d are secured against falling out.

For guiding the toothed racks 129, guide walls are formed on the underside of the placement deck. The connecting part 127 couples the equally designed toothed racks with each other, wherein the toothed racks 129 have coupling spigots and the connecting part 127 has openings for the coupling spigots through which said coupling spigots extend. The connecting part 127 is fixed by means of spring nuts (see FIG. 4a) on the coupling spigots. The four spacers 120b1 to 120b4 have a screw hole in a hexagon part on their one end and have, on their other end, a cylinder with a stepped diameter. The cylinders extend through respective openings in the bearing plate 19a when the bearing plate was mounted (see FIG. 3 and FIG. 5). The toothed belt disc 12602 of the intermediate transmission 1260 of the direction alignment mechanism 126 is coupled via toothed belt 125 with a toothed belt disc 1211, the latter being connected by positive joint with the setting means 121 for direction alignment. Rows a and b of the installed transport modules form a block of six and rows c and d of the installed transport modules form a block of four. For the sake of simplicity, FIG. 4 shows the same direction adjustment of all transport modules. The design of the transport modules and an initial positioning of the transport modules in the course of their installation on the underside 120b of the placement deck 12 basically allows different orientations of the transport modules in relation to each other. It is provided that, for the initial positioning of the permanently positioned transport modules in row a, the transport modules are aligned at a first pre-defined alignment angle relative to the transport direction x and, for the initial positioning of the variably positionable transport modules in row b, the transport modules are aligned at a second pre-defined alignment angle relative to the transport direction x. For the transport modules in row c, an alignment of the transport modules at a third pre-defined alignment angle relative to the transport direction x is possible. However, the design of the transport modules does also allow any different initial positioning of the transport modules in relation to each other within a row.

Figure 4A:
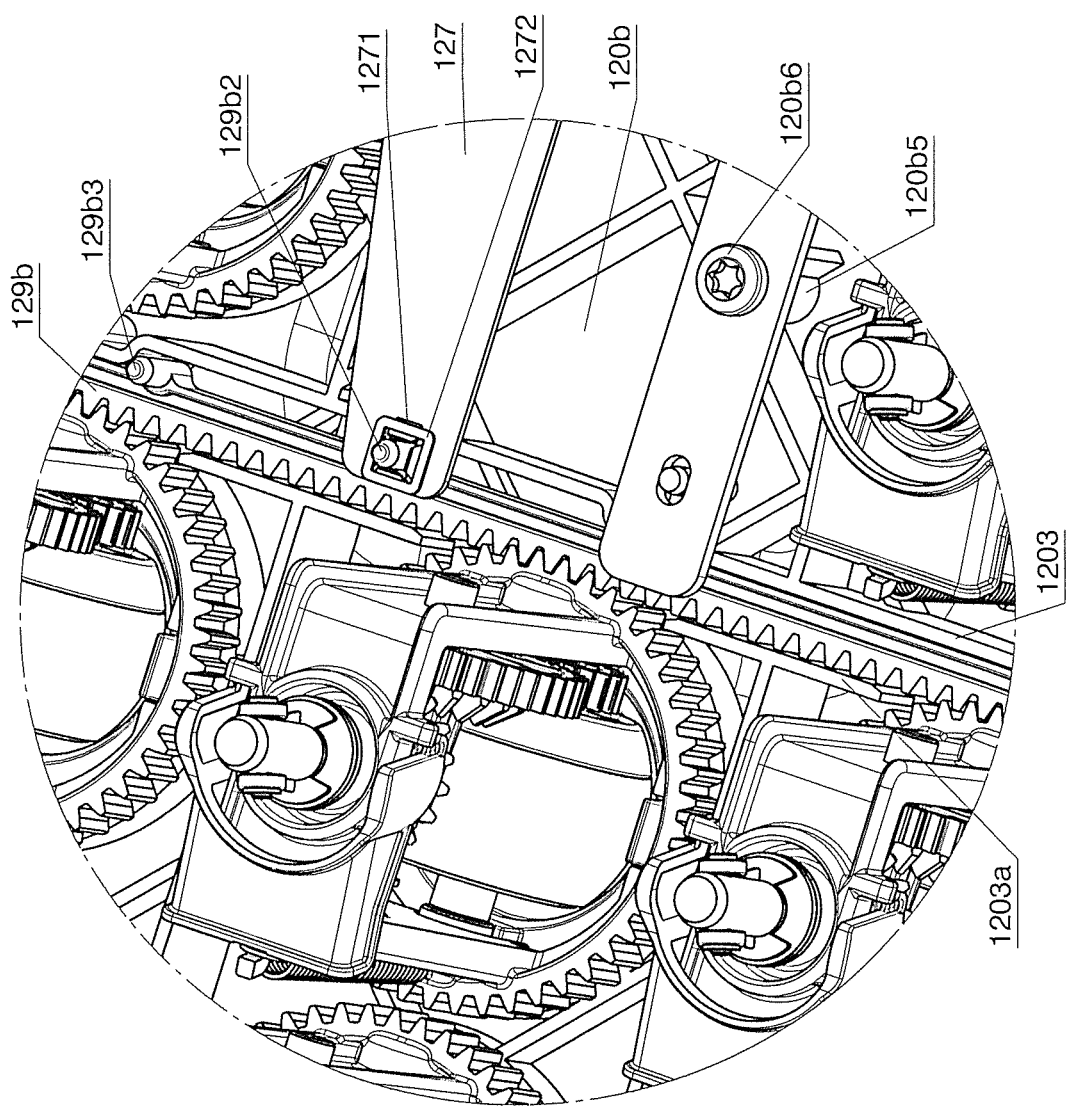
FIG. 4*a* is a perspective view of a section of the underside of the placement deck with installed transport modules, according to FIG. 4.

FIG. 4a shows a perspective view of an enlarged section of the underside of the placement deck with installed transport modules, according to FIG. 4. The underside 120b of the placement deck has a fixing dome 120b5 for the holding sheet 12092 fixed by a screw as fixing means 120b6. The connecting part 127 has an opening 1271 for the coupling spigot 129b2 to be fixed by means of a spring nut 1272. A further coupling spigot 129b3 remains unused here. The coupling spigots 129b2, 129b3 are formed on the toothed rack 129b that is shiftable within a guide on the underside 120b of the placement deck, said guide being limited by a guide wall 1203 on the one side and a wall piece 1203a on the other side.

Figure 5:
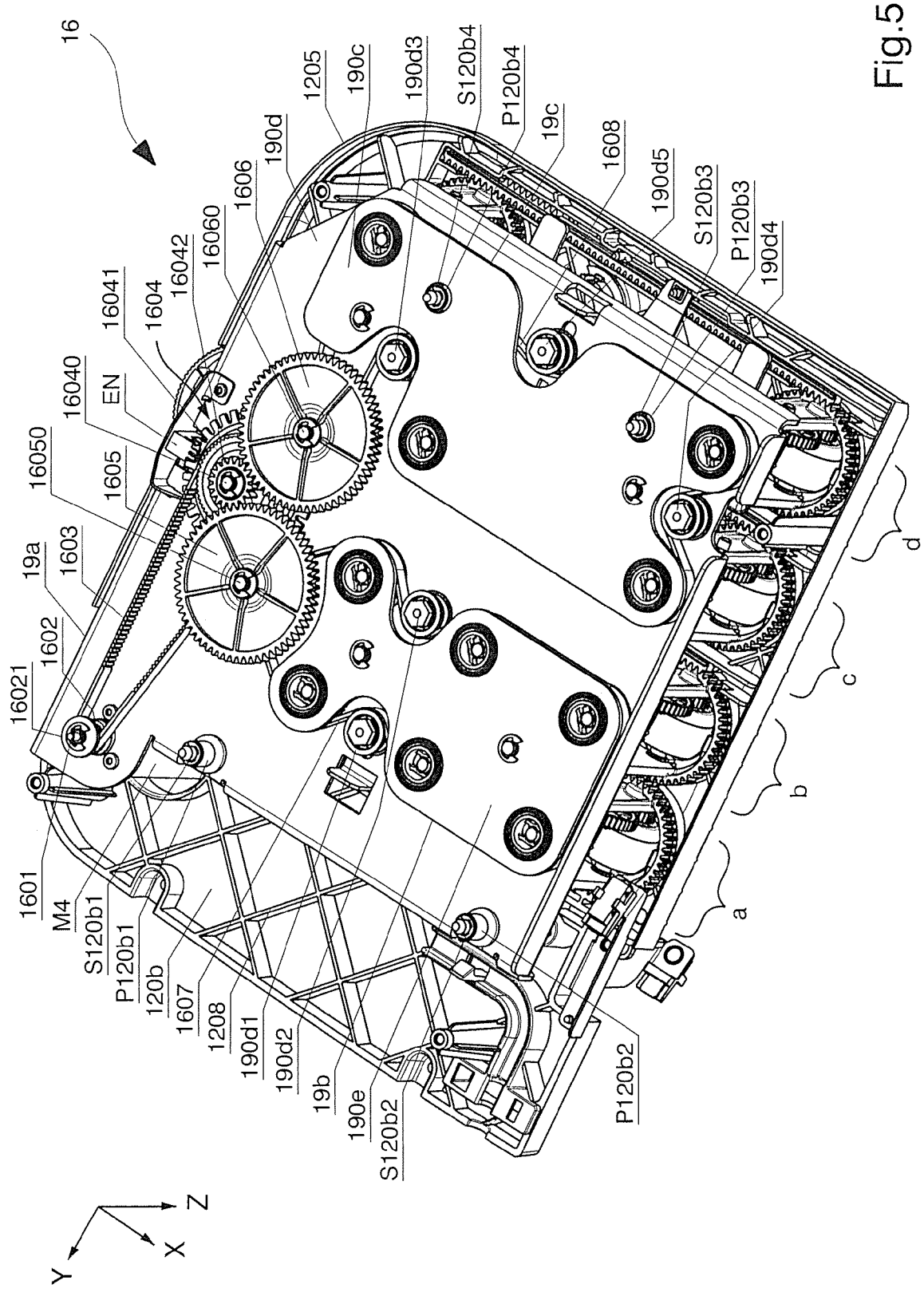
FIG. 5 is a perspective view of an arrangement of two counter-bearing plates at a distance from the bearing plate and from the underside of the placement deck.

FIG. 5 shows a perspective view of an arrangement of two counter-bearing plates at a distance from the bearing plate and at a distance from the underside of the placement deck. On the underside 190d of the bearing plate, there is arranged a drive mechanism 16 for a common drive of all transport elements. At a small distance to the alignment wall, the cylinders of the spacers 120b1 and 120b2 extend through the respective openings in the installed bearing plate 19a contrary to the z-direction (in the direction of gravity). At the end of the spacers 120b1, 120b2, a spacer sleeve P120b1, P120b2, respectively, and a lock washer S120b1, S120b2, respectively, are mounted. The ends of the cylinders of the spacers 120b3 and 120b4 extend through the bearing plate and the counter-bearing plate 19c of the block of four. On the cylinders, the spacer sleeves P120b3, P120b4 are mounted that fix the bearing plate 19a. One lock washer each S120b3, S120b4 is fixed on the end of the cylinders of the spacers 120b3, 120b4, respectively.

At a distance beside the screw body of the spacer 120b1, the motor shaft 1601 of the motor M4 also extends through a respective opening in the mounted bearing plate 19a contrary to the z-direction (in the direction of gravity). A toothed belt roller 1602 is non-positively and/or positively connected with the motor shaft 1601 and mounted in such a way that the outer edge of the toothed belt disc 16021 of the toothed belt roller 1602 is used on a side distant from the bearing plate 19a in order to prevent the toothed belt 1603 from slipping off from the toothed belt roller 1602 in the direction of gravity during operation. An area on the mail-item entrance side of the placement station is located between the opening 12050 in the collar 1205 on the edge on the mail-item entrance side of the placement deck (FIG. 1) and an imagined line between the spacers 120b1 and 120b4 (FIG. 5). Below the area on the mail-item entrance side of the placement station, three fixed bearing axles 16040, 16050 and 16060 were mounted on the underside 190d of the bearing plate 19a so that they extend contrary to the z-direction. The fixed bearing axle 16050 is arranged on the mail-item entrance side of the block of six transport modules of the rows a and b and the fixed bearing axle 16060 is arranged on the mail-item entrance side of the block of four transport modules of the rows c and d. The fixed bearing axle 16040 is arranged on the mail-item entrance side between the bearing axles 16050 and 16060 of the of the block of four and the block of six, respectively, and the edge on the mail-item entrance side of the placement deck. The toothed belt 1603 drives a first transmission stage 1604 having a large toothed belt disc 16041 and a small gear wheel 16042 both of which are connected by positive joint with an encoder disc, wherein the first transmission stage 1604 is rotatably borne on the fixed bearing axle 16040 and reduces the motor speed. An encoder EN is arranged close to the edge on the mail-item entrance side of the placement deck at the encoder disc. A second transmission stage 1605 is provided for the block of six and rotatably borne on the fixed bearing axle 16050 and a second transmission stage 1606 is also provided for the block of four and rotatably borne on the fixed bearing axle 16060, said second transmission stages further reducing the motor speed. The second transmission stage 1605 and 1606, respectively, is composed of a large gear wheel 16051 and 16061, respectively, and a small toothed belt disc 16052 and 16062, respectively, that are connected with each other by positive joint and rotatably borne on the fixed bearing axle 16050 and 16060, respectively, for reducing the motor speed. The toothed belt 1603 is in engagement with the large toothed belt disc 16041 and the small gear wheel 16042 is in engagement with the large gear wheels 16051, 16061 (FIG. 7). On the small toothed belt discs 16052 and 16062, respectively, there is running a toothed belt 1607 and 1608, respectively, that drives the toothed belt discs of the block of six and of the block of four, respectively (FIG. 5). On the block of six and the block of four, respectively, there are provided one belt tightener roller 190d1 and 190d5, respectively, and a return roller 190d2 and 190d3, 190d4, respectively, for the toothed belt 1607 and 1608, respectively. The toothed belt discs of the block of six are arranged between the bearing plate 19a and the counter-bearing plate 19b and the toothed belt discs of the block of four are arranged between the bearing plate 19a and the counter-bearing plate 19c. The counter-bearing plate 19b and 19c, respectively, has an underside 190e and 190c, respectively, in which circular openings for the bearings of the toothed belt discs are provided. The bearing plate 19a has equal openings for the bearings of the toothed belt discs (see FIG. 2). On the underside 120b of the placement deck, diagonal stiffening walls 1208 are arranged between parallel stiffening walls 128 (see FIG. 6).

Figure 6A:
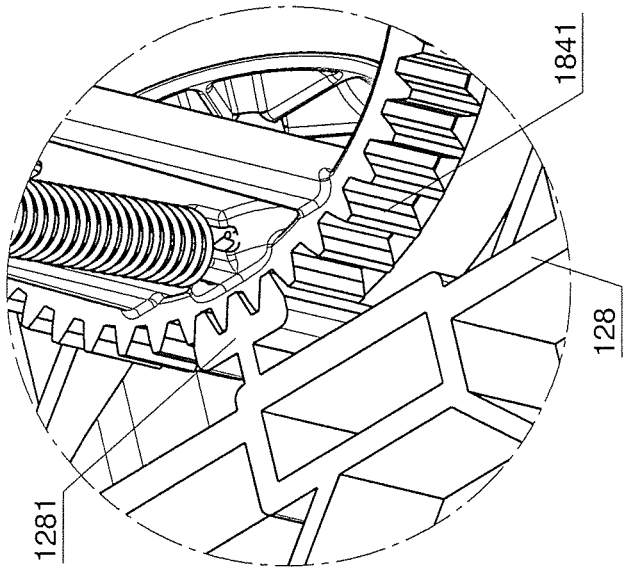
FIG. 6*a* shows detail A1 of FIG. 6.
Figure 6:
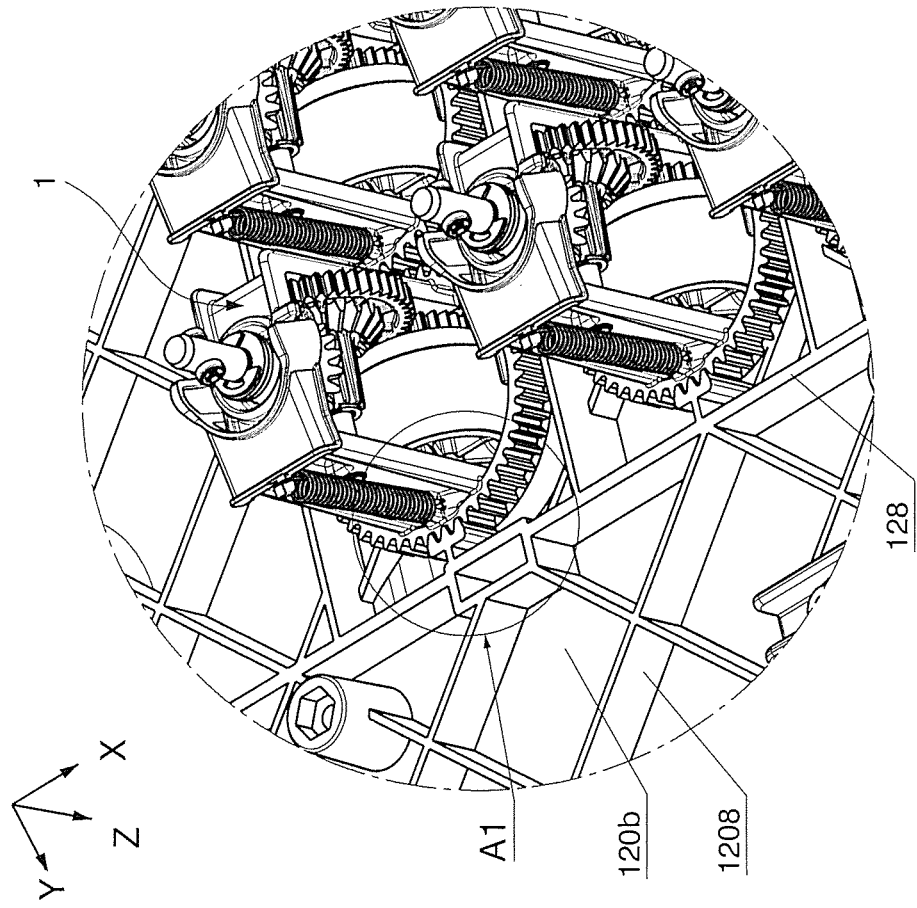
FIG. 6 is a perspective view of a section of the underside of the placement deck.
Figure 7:
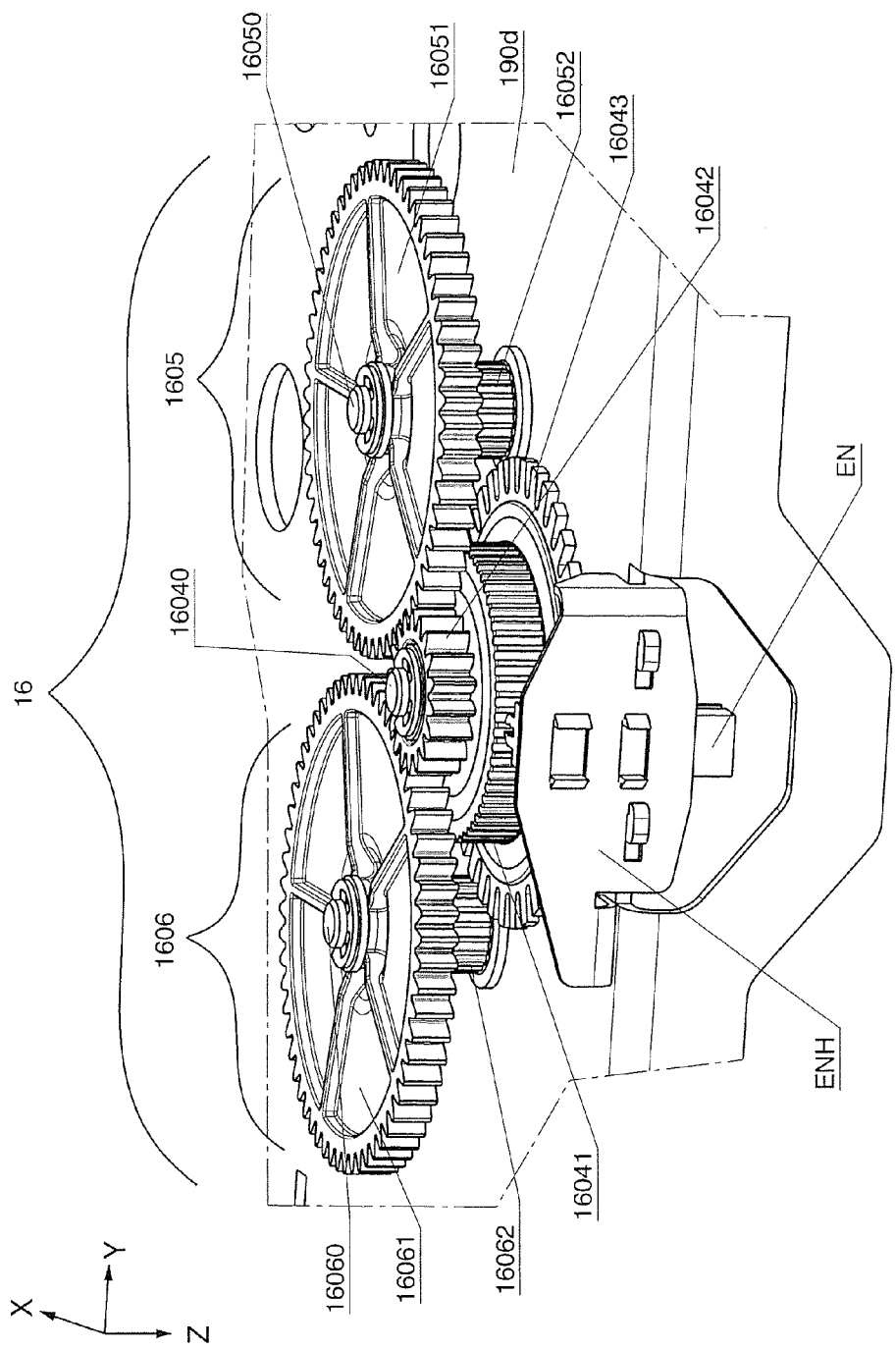
FIG. 7 is a perspective view of a section of the underside of the bearing plate with a transmission of the drive mechanism.

FIG. 6 shows a perspective view of a section of the underside of the placement deck. A stiffening wall 128 stabilizes the placement deck in the marginal area of the block of six transport modules 1 and allows to align the transport modules when mounting them (see detail A1).

FIG. 6a shows a detail A1 of FIG. 6. A tooth contour 1281 is formed on the stiffening wall 128 that is put in engagement with the teeth of the annular external gear rim 1841 of the transport module carrier of a permanently positioned transport module.

FIG. 7 shows a perspective view of a section of the underside of the bearing plate with a transmission of the drive mechanism 16. On the underside 190d of the bearing plate, there is mounted an encoder holder ENH for the encoder EN, said encoder EN being directed in transport direction to the encoder disk 16043 that forms, together with the small gear wheel 16042 and the large toothed belt disc 16041, a component of a first transmission stage that is rotatably mounted on a fixed axle 16040, wherein the teeth of the small gear wheel 16042 are in engagement with the teeth of the large gear wheels 16051 and 16061. The latter are rotatably mounted on fixed axles 16050 and 16060 and form the second transmission stages 1605 and 1606.

Figure 8:
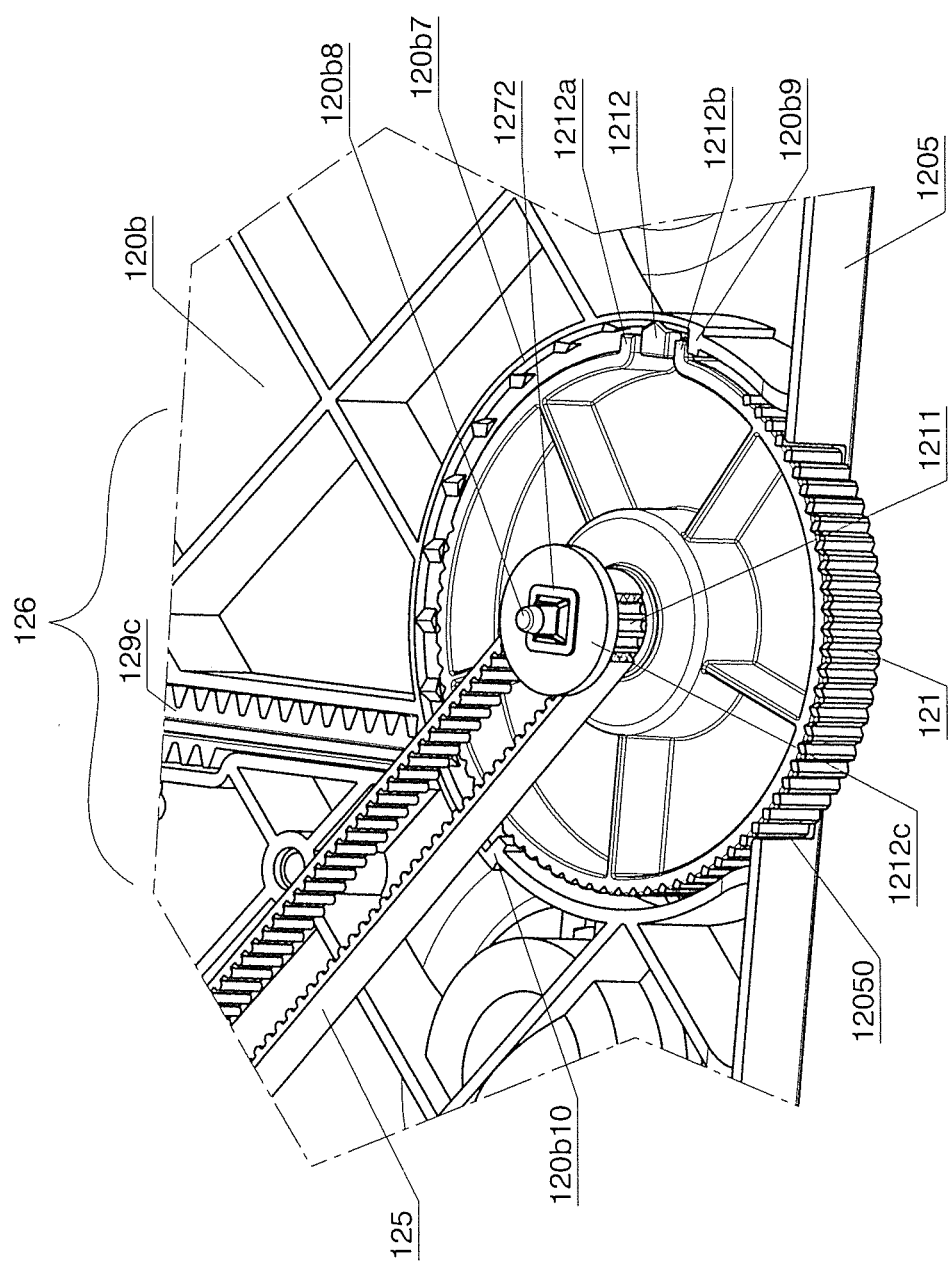
FIG. 8 is a perspective view of a section of the underside of the placement deck with a transmission of the direction alignment mechanism.

FIG. 8 shows a perspective view of a section of the underside 120b of the placement deck 12 with a transmission 126 of a direction alignment mechanism, wherein the latter effects, via an intermediate transmission, a shifting of a toothed rack 129c and thereby a change of the direction of the transport modules. The setting means 121 is connected by positive joint with a toothed belt disc 1211. Both have a central bearing hole. A bearing dome 120b8 is formed on the underside 120b of the placement deck. The setting means 121 and the toothed belt disc 1211 are slipped on the bearing dome 120b8 and rotatably fixed by means of a washer 1212c as well as a spring nut 1272. The toothed belt disc 1211 is coupled with a toothed belt 125 that transmits the rotation to the intermediate transmission (FIG. 3a).

The aforementioned means—shown in FIG. 8—form a transmission 126 for transmitting the rotary motion on the external circumference of the setting means 121 that is shaped as a wheel here. A springy stop nose 1212 is formed on the external circumference of the wheel. On both sides of the stop nose, stop walls 1212a and 1212b are formed on the external circumference of the wheel. The collar 1205 passes, on both sides of the opening 12050, into a circle segment wall 120b7 with an end stop 120b9 and 120b10 each. Between the end stops, stop notches are formed into the inner side of the circle segment wall 120b7 in which the stop nose 1212 engages in a springy manner when the wheel is manually turned whereby an angular position from 0° to 45° in relation to the transport direction can be set for the transport modules in steps of e.g. 4.5°.

As an alternative—in a manner not shown—the setting means 121 can also be shaped as a lever with a circle segment. The wheel or the lever project from the opening 12050 of the collar 1205 on the edge on the mail-item entrance side of the placement deck and serve to manually set the angle of direction.

In another alternative, a toothed disk on which a belt 125 of the direction alignment mechanism runs is fixed on a drive shaft of a setting motor. The setting motor may be for example a step motor. The toothed disc is suited for automatic adjustment of the angle of direction, wherein the angular adjustment is achieved by means of a control unit with a program for the electric triggering of the step motor depending on requirements, wherein further sensors are arranged that detect the requirements and there is provided a memory means in which a software for analyzing the requirements is stored. An arrangement of sensors can be provided on the placement deck 12 and/or on the alignment wall 11 of the placement station 10, wherein said sensors are electrically connected with the means for controlling the transport speed, the aforementioned means containing at least a control unit.

It is provided that the step motor is electrically connected via an interface unit with the control unit in order to control the movement of the respective lowermost flat item of a stack by the traction exerted by the transport elements in the y-direction. With the use of the step motor, the setting accuracy can be advantageously increased due to a small step width because each step will be smaller and the number of steps is respectively increased. In this case, the stop nose is not required.

Although modifications and changes may be suggested by those skilled in the art, it is the intention of the inventors to embody within the patent warranted hereon all changes and modifications as reasonably and properly come within the scope of their contribution to the art.

We claim as our invention:

1. A placement station for placing flat items and feeding them to a singularization station, having a plurality of transport elements each of which extends through a related opening in a placement deck of the placement station in a z-direction of a Cartesian coordinate system, all transport elements being driven by one single drive motor via toothed belt discs and toothed belts, said placement station comprising:

at least one trigger sensor is arranged in the placement station on the exit side of the mail-item flow, wherein the trigger sensor and the drive motor are electrically connected with a transport speed processor configured to control the transport speed of the flat items transported by the transport elements in a transport direction x of the Cartesian coordinate system;

each transport element is carried by a transport module, and that the placement station is provided with a plurality of transport modules each of which extends with a transport element mounted on its head side through a related opening in a placement deck of the placement station in the z-direction;

the direction of traction can be changed by turning at least one transport module before or during operation of the placement station;

each transport element has a ball-shaped, round, or barrel-shaped body with an equator, wherein different friction values of said body of the transport element are provided on both sides of the equator;

the transport modules are positioned in such a direction that the half of the body of the transport element with the higher friction value is closest to the alignment wall; and the transport modules are arranged in a manner lowerable below the placement deck in a direction contrary to a spring force.

2. A placement station according to claim 1, wherein, at a minimum distance to the alignment wall of the placement station, a row (a) of transport modules that can be positioned in a fixed alignment direction and, at a larger up to a maximum distance to the alignment wall, further rows (b, c, d) of transport modules that can be positioned in variable directions are arranged, wherein each row extends in the transport direction x and row c neighbors row d, row b neighbors row c, and row a neighbors row b in a y-direction of the Cartesian coordinate system, and that, on the one hand, the rows b, c, d that can be positioned in variable directions are provided for aligning on the alignment wall flat items which are individually and successively ejected from an upstream enveloping station onto the placement deck of the placement station and, on the other hand, the rows b, c, d are provided for aligning a stack of small- or large-format flat items of different thicknesses and with format deviations that is put on the placement station.

3. A placement station according to claim 2, wherein the transport modules are positioned in an initial position during installation thereof on the underside of the placement deck.

4. A placement station according to claim 3, wherein for the initial positioning of the permanently positioned transport modules in row (a), the transport modules are aligned at a first pre-defined alignment angle relative to the transport direction x and, for the initial positioning of the variably positionable transport modules in row (b), the transport modules are aligned at a second pre-defined alignment angle relative to the transport direction x.

5. A placement station according to claim 3, wherein the initial positioning of the transport modules is different in any direction.

6. A placement station according to claim 1 comprising a tooth system that connected all variably positionable transport modules in their multiple angular positions in a self-locking manner with each other, and comprising a setting mechanism having a transmission.

7. A placement station according to claim 1, wherein the setting mechanism is part of a direction alignment mechanism.

8. A placement station according to claim 4, wherein the direction alignment mechanism comprises toothed racks that are mechanically coupled with each other via a connecting part, wherein each of the toothed racks has teeth arranged at least on one side, which teeth are in engagement with the teeth of an annular external gear rim of the carrier ring.

9. A placement station according to claim 1 comprising a setting assembly for direction adjustment in order to turn the transport modules by mechanical shifting into an angle of orientation relative to the transport direction x.

10. A placement station according to claim 6, wherein the setting assembly comprises a wheel or as a lever with a circle segment.

11. A placement station according to claim 7, wherein the setting assembly is configured to adjust the angle of orientation from 0° to 45° relative to the transport direction x by fixed steps is provided.

12. A placement station according to claim 1, wherein each step of setting by fixed steps corresponds to one angle segment within a range of 3° to 9°.

13. A placement station according to claim 9, wherein the setting assembly comprises a toothed disc that is fixed on a drive shaft of a setting motor.

14. A placement station according to claim 13, wherein the setting motor is a step motor that is electrically connected via an interface unit with the transport speed processor in order to control the movement of the respective lowermost flat item of a stack by the traction exerted by the transport elements in the y-direction.

15. A placement station according to claim 1 comprising a trigger sensor for detecting the placement of a stack or of an individual flat item, an encoder and at least one further sensor for detecting an incorrect position alignment of the stack or of the individual flat item and that the sensor and encoder signals of the placement station are interrogated by the control unit.

16. A placement station according to claim 15, wherein the trigger sensor is also configured to detect an incorrect position alignment of the stack or individual flat item.

17. A placement station according to claim 1, comprising an arrangement of sensors on the placement deck and/or on the alignment wall, an encoder holder for an encoder arranged on an underside of a bearing plate, and the sensors and the encoder are electrically connected with the transport speed processor.

18. A placement station according to claim 17, wherein the transport speed processor is arranged in the placement station and/or in an item-processing station following in downstream direction of the mail-item flow, and the sensors and the drive motor are connected via interfaces with the transport speed processor.

* * * * *